(12) United States Patent
Ahmad et al.

(10) Patent No.: US 12,709,030 B2
(45) Date of Patent: Aug. 18, 2026

(54) PROTECTIVE END CAP FOR INSULATING DEVICE

(71) Applicant: HONEYWELL SAFETY PRODUCTS USA, INC., Charlotte, NC (US)

(72) Inventors: Rizwan Ahmad, Hyderabad (IN); Raviteja Tata, Vuyyuru (IN); Prudhvi Yarlagadda, Hyderabad (IN); Alfred Flojo, Chicago, IL (US)

(73) Assignee: Honeywell Safety Products USA, Inc., Latham, NY (US)

( * ) Notice: Subject to any disclaimer, the term of this patent is extended or adjusted under 35 U.S.C. 154(b) by 1120 days.

(21) Appl. No.: 17/804,233

(22) Filed: May 26, 2022

(65) Prior Publication Data

US 2023/0381983 A1 Nov. 30, 2023

(51) Int. Cl.
*B25J 19/00* (2006.01)
*B25J 1/04* (2006.01)

(52) U.S. Cl.
CPC ............. *B25J 19/0091* (2013.01); *B25J 1/04* (2013.01)

(58) Field of Classification Search
CPC ........... B25J 19/0091; B25J 1/04; B66C 1/12; B66C 1/62
USPC ....................................................... 294/82.13
See application file for complete search history.

(56) References Cited

U.S. PATENT DOCUMENTS 1,639,786 A * 8/1927 Steinmetz ................. B66C 1/14 220/760
4,139,179 A * 2/1979 Kukulski .................. B66C 1/12 294/82.12
4,629,235 A * 12/1986 Logue .................... A63B 47/02 294/19.2
5,184,410 A * 2/1993 Hamilton ............... A43B 11/00 36/105
5,299,464 A 4/1994 Bennett
5,775,751 A * 7/1998 Nelson ................... A63B 47/02 206/315.9
7,967,352 B2 * 6/2011 Di Martino ............... B66C 1/22 294/81.1
8,844,990 B2 * 9/2014 Bingham ................ G09F 23/00 40/124.06
9,132,993 B1 * 9/2015 DiMartino ................ B66C 1/12

(Continued)

OTHER PUBLICATIONS

CA Office Action Mailed on Sep. 13, 2024 for CA Application No. 3198503, 3 page(s).

*Primary Examiner* — Paul T Chin
(74) *Attorney, Agent, or Firm* — Fredrikson & Byron, P.A.

(57) ABSTRACT

An impact reduction mechanism is provided, utilizing a protective end cap to reduce the force transferred to the body of a insulating device when the insulating device encounters an impact force to the base end. An example insulating device may include a body defining a first end and a second end and a protective end cap attached to the first end of the body. The protective end cap may define a base and one or more walls. The protective end cap may embody an impact reduction mechanism, defining a gap formed between the first end of the body and the base of the protective end cap. The impact reduction mechanism may be configured to reduce an overall force received by the body of the insulating device in an instance in which the protective end cap is subjected to an impact force.

20 Claims, 12 Drawing Sheets

(56) References Cited

U.S. PATENT DOCUMENTS

| | | | | |
|---|---|---|---|---|
| 9,630,064 | B1 * | 4/2017 | Cardello, Sr. .......... | A63B 47/02 |
| 11,510,554 | B1 * | 11/2022 | Aurilia ................ | A61B 1/0011 |

* cited by examiner

PROTECTIVE END CAP FOR INSULATING DEVICE

TECHNOLOGICAL FIELD

Embodiments of the present disclosure relate generally to insulating devices and, more particularly, to mechanisms for protecting insulating devices from impact forces.

BACKGROUND

Working in hazardous conditions, such as those involving open electrical contacts, or high voltage wires, can be dangerous. As such, workers often use insulating devices (e.g., hotsticks) to minimize the risk of electric shock while performing tasks in hazardous conditions. Additional environmental conditions (e.g., rain, snow, etc.), as well as the weight and size of an insulating device, may present numerous scenarios in which an insulating device may be dropped. Applicant has identified many technical challenges and difficulties associated with impacts to the base end of an insulating device. Through applied effort, ingenuity, and innovation, Applicant has solved problems related to these insulating devices by developing solutions embodied in the present disclosure, which are described in detail below.

BRIEF SUMMARY

Various embodiments are directed to an example protective cap for an insulating device. In accordance with some embodiments of the present disclosure, an example insulating device is provided. In some embodiments, the insulating device may include a body defining a first end and a second end. In some embodiments, the insulating device may further comprise a protective end cap attached to the first end of the body, the protective end cap defining a base and one or more walls. In some embodiments, the protective end cap may comprise an impact reduction mechanism defining a gap formed between the first end of the body and the base of the protective end cap. In some embodiments, the impact reduction mechanism may be configured to reduce an overall force received by the body in an instance in which the protective end cap is subjected to an impact force.

In some embodiments, in an instance in which the protective end cap is subjected to the impact force, the body of the insulating device may move unobstructed at least partially into the gap formed between the first end of the body and the base of the protective end cap.

In some embodiments, the one or more walls of the protective endcap may elastically deform responsive to the impact force.

In some embodiments, the base of the protective end cap may further comprise a protrusion extending from the base into the gap toward the first end of the body.

In some embodiments, a first distance may be defined between the first end of the body and the base of the protective end cap and a second distance may be defined between the first end of the body and the protrusion extending from the base, wherein the first distance is less than the second distance.

In some embodiments, responsive to the impact force, the protrusion may elastically deform, reducing the first distance defined between the first end of the body and the base of the protective end cap.

In some embodiments, the body may comprise a plurality of sections, each of which nest sequentially within one another.

In some embodiments, a first section of the plurality of sections may be nested within a second section of the plurality of sections.

In some embodiments, a first section of the plurality of sections may extend beyond the peripheral edge of a second section of the plurality of sections.

In some embodiments, the base and one or more walls of the protective end cap may form a single integral body.

In some embodiments, the first end of the body may be at least partially received by the one or more walls of the protective end cap.

In some embodiments, the protective end cap may comprise an elastically deformable material.

In some embodiments, the elastically deformable material may comprise a durometer between 50 and 70.

In some embodiment, the insulating device may further comprise an interior end cap attached to the first end of the insulating device.

In some embodiments, the interior end cap may be enclosed within the one or more walls of the protective end cap.

In some embodiments, the interior end cap may define one or more vents defining fluid communication from the interior of the insulating device to an exterior environment.

In some embodiments, the protective end cap may attach to the first end of the insulating device using one or more fasteners.

In some embodiments, the one or more fasteners may pass through the protective end cap, through the insulating device, and into or through the interior end cap.

In some embodiments, the protective end cap may be attached to the first end of the insulating device via an adhesive.

In some embodiments, the gap defined between the first end of the insulating device and the base of the protective end cap may be at least 3 millimeters and less than 200 millimeters. The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
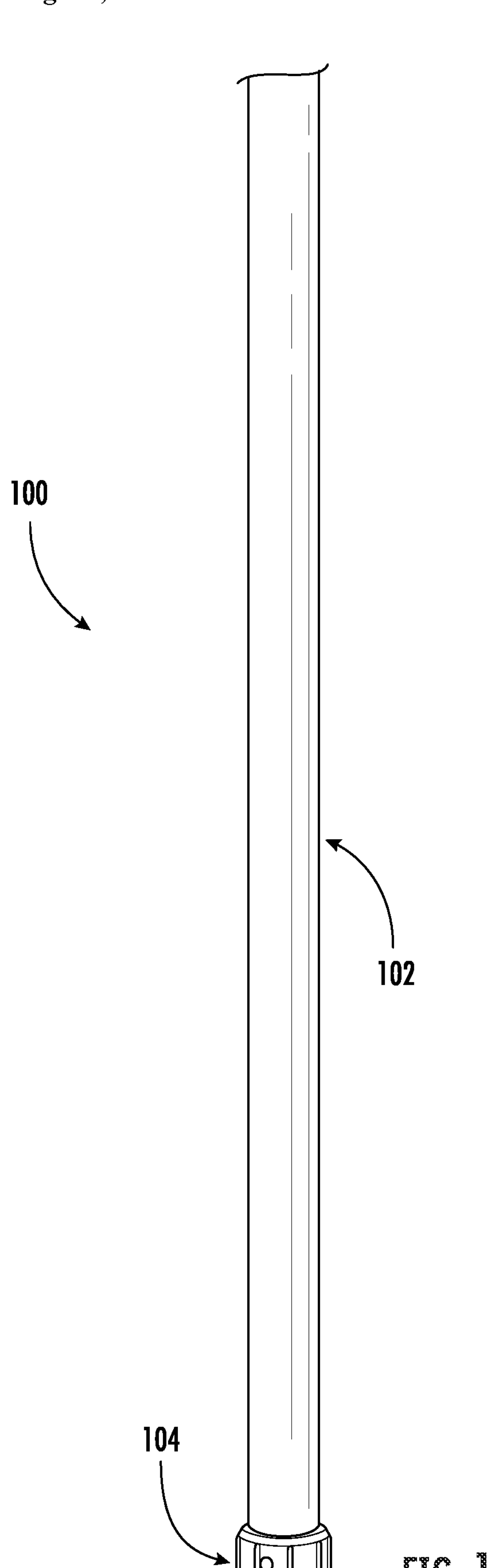
FIG. 1 illustrates a perspective view of a portion of an example insulating device in accordance with an example embodiment of the present disclosure.

Example embodiments will be described more fully hereinafter with reference to the accompanying drawings, in which some, but not all embodiments of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with reducing the impact transferred to the body of an insulating device when an impact force is applied to the base end of the insulating device. As understood by those of skill in the field to which the present disclosure pertains, there are numerous scenarios in which the base end of an insulating device may experience impact, potentially damaging the insulating device. In general, insulating devices are designed to provide a user with an extended reach, helping the user maintain safety while working in potentially dangerous environments (e.g., on electrical systems). Insulating devices may be formed of a single section (e.g., clampsticks, discharge sticks, prong sticks, etc.) or may define a plurality of sections that telescopically extend to distances at or above fifty feet. These insulating devices may weigh more than 20 pounds and may often be operated in adverse environmental conditions (e.g., rain, snow, etc.). Such characteristics set-up numerous scenarios where insulating devices may be dropped, impacting the ground or another rigid surface, particularly at the base end of the insulating device. These impacts can cause damage to the insulating device and/or compromise the device's effectiveness. In addition to sudden drops or freefalls experienced during operational use of the insulating device, sufficient protection is necessary to protect insulating devices during storage and transportation. Further, industry standards, such as ASTM 1826 and other similar standards, may require a telescopic insulating device to survive a drop from a designated height such that the device's effectiveness as an insulator are maintained and no visible damage to the insulating device is sustained.

Conventional attempts at minimizing the impact experienced by the insulating device during drops, freefalls, and/or storage, rely upon cushioning devices placed directly in contact with the base end of the insulating device. These conventional designs, however, fail to provide adequate protection to the insulating device, allowing impact forces to easily transfer to the body of the insulating device, especially as the height of the fall and/or the weight of the insulating device increases. Drops and/or freefalls often result in cracks and/or damage to the body of the insulating device, compromising the effectiveness of the tool. In addition, impacts to the base of a telescopic insulating device may cause damage to buttons or other structures holding the telescopic sections in an extended position. Further, the insulating characteristics of the device may be compromised by damage to the body of the insulating device.

The various embodiments herein, including but not limited to an insulating device including a protective end cap, utilize various features to provide protection to the body of an insulating device. For example, in some embodiments, a protective end cap for an insulating device may include an impact reduction mechanism defining a gap or cavity between the base end of the body of the insulating device and the base of the protective end cap. In one example embodiment, the walls of the protective end cap may at least partially enclose the base end of the body of the insulating device and attach near the peripheral edge of the base end of the body, such that a cavity between the base end of the insulating device and the base of the protective end cap is formed and void of any inhibiting structures. Thus, when an impact force is applied to the base of the protective end cap, the walls of the protective end cap are compressed and/or deformed, allowing the base of the end cap to move closer to the base of the body of the insulating device, reducing the distance between the base end of the body of the insulating device and the base of the protective end cap. The compression and/or deformation of the protective end cap thus reduces the force of the impact applied to the body of the insulation device.

In another example embodiment, an elastically deformable structure may be positioned in the cavity formed between the base end of the body of the insulating device and the base of the protective end cap. The structure may deform and/or compress when an impact force is applied to the end of the insulating device and the structure comes into contact with the base end of the body of the insulating device. The compression and/or deformation of the structure may aid in the reduction of the impact force transferred to the body of the insulating device. As a result of the herein described embodiments and examples, the impact force received by the body of the insulating device may be reduced, allowing the insulating device to maintain functionality after experiencing an impact force to the base of the insulating device.

Figure 8:
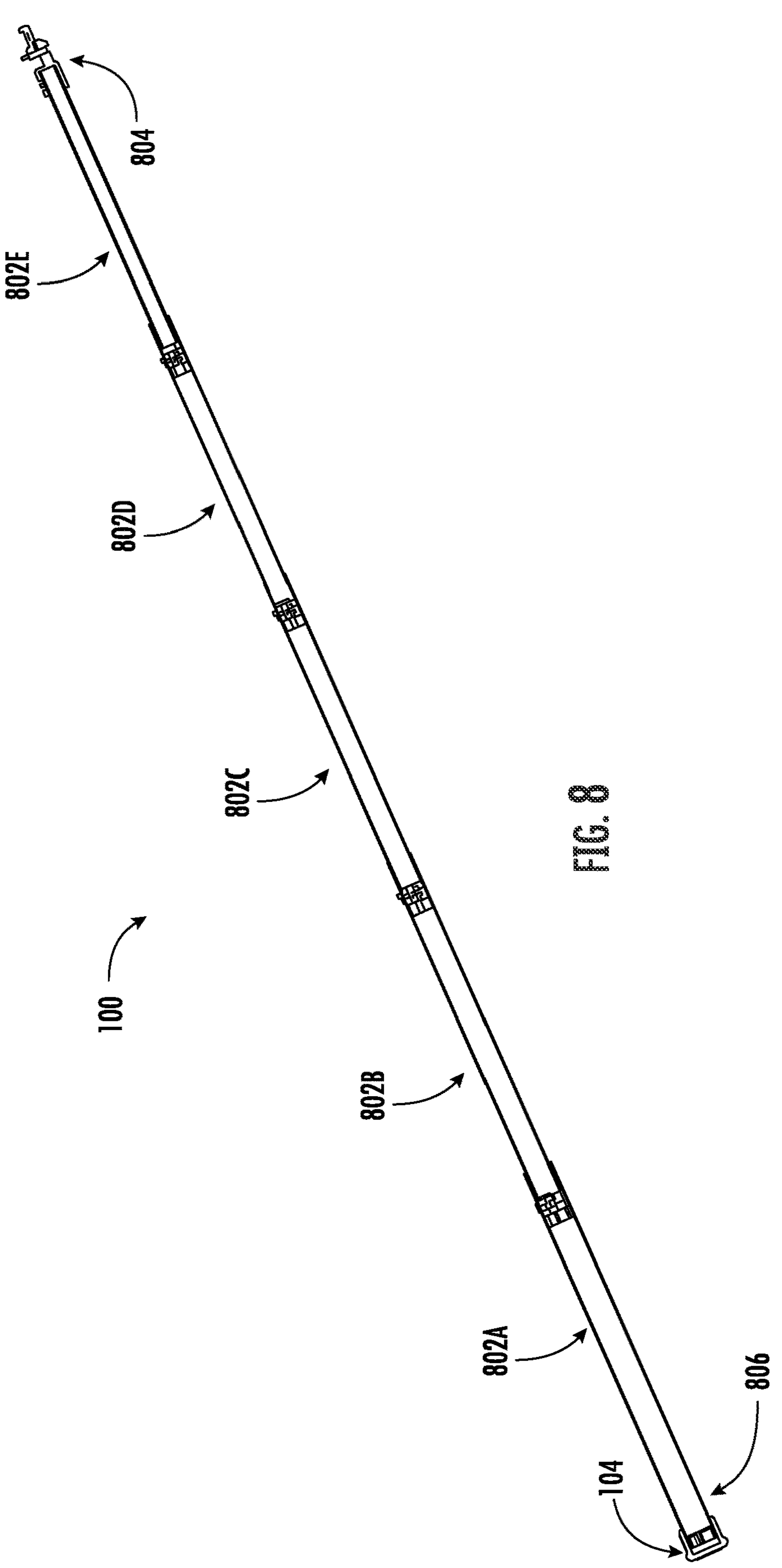
FIG. 8 illustrates a cross-sectional view of an example insulating device defining a plurality of sections in accordance with an example embodiment of the present disclosure.

FIG. 1 illustrates a perspective view of an insulating device 100 according to various embodiments described herein. An insulating device 100 may, in some examples, include a protective end cap 104 attached to a body 102. The body 102 may be any long, slender structure capable of maintaining a rigid form while extending the reach of a user. The body 102 of an insulating device may be formed of, for example, an engineered plastic (e.g., thermoplastic and thermoset), carbon fiber, fiberglass, metal alloy, wood, and/or other similar material. In some embodiments, the body 102 of the insulating device 100 may include an attachment end 804 (as shown in FIG. 8) configured to receive a tool or attachment, attached to aid in the accomplishment of a user task and a base end 806 (as shown in FIG. 8) configured to be held by the user and to be attached to the protective end cap 104. In some embodiments, the body 102 may be formed of a material that is an electrical insulator (e.g., fiberglass), preventing the free flow of electricity from the attachment end 804 of the body 102 to the base end 806 of the insulating device 100. In some embodiments, the body 102 may form a triangular or tri-flat cross-sectional shape to facilitate improved grip and ease in locking telescopic sections. In some embodiments, the body 102 may define a circular cross-section. Still, in some embodiments, the body 102 may define any cross-sectional shape or combination of cross-sectional shapes capable of facilitating grip or improve handling by a user. In some embodiments, the body 102 may be hollow, while in other embodiments, the body 102 may be filled with foam or other material to maintain rigidity and insulating properties while reducing weight and preventing other materials from entering into the body 102. In some embodiments, the body 102 may define a plurality of sections 802 (as shown in FIG. 8).

FIG. 1 further illustrates a protective end cap 104 attached to the base end 806 of the body 102. The protective end cap 104 may be any structure capable of attaching to an end of the body 102 and providing protection to the insulating device 100. In some embodiments, the protective end cap 104 may be attached to the body 102 using a fastener (e.g., screws 204), adhesive, or other attaching device. In some embodiments, the protective end cap 104 may be configured to at least partially receive the base end 806 of the body 102. In some embodiments, the protective end cap 104 may be configured such that the full cross-sectional area of the peripheral edge of the base end 806 is fully enclosed by the protective end cap 104. In some embodiments the protective end cap 104 may be formed of an elastically deformable material, for example, ethylene propylene diene monomer (EPDM) rubber. In some embodiments, the durometer of the protective end cap 104 may be between 50 and 70. In some embodiments, the durometer may be between 55 and 65. In some embodiments, the durometer may be between 58 and 62.

Figure 2:
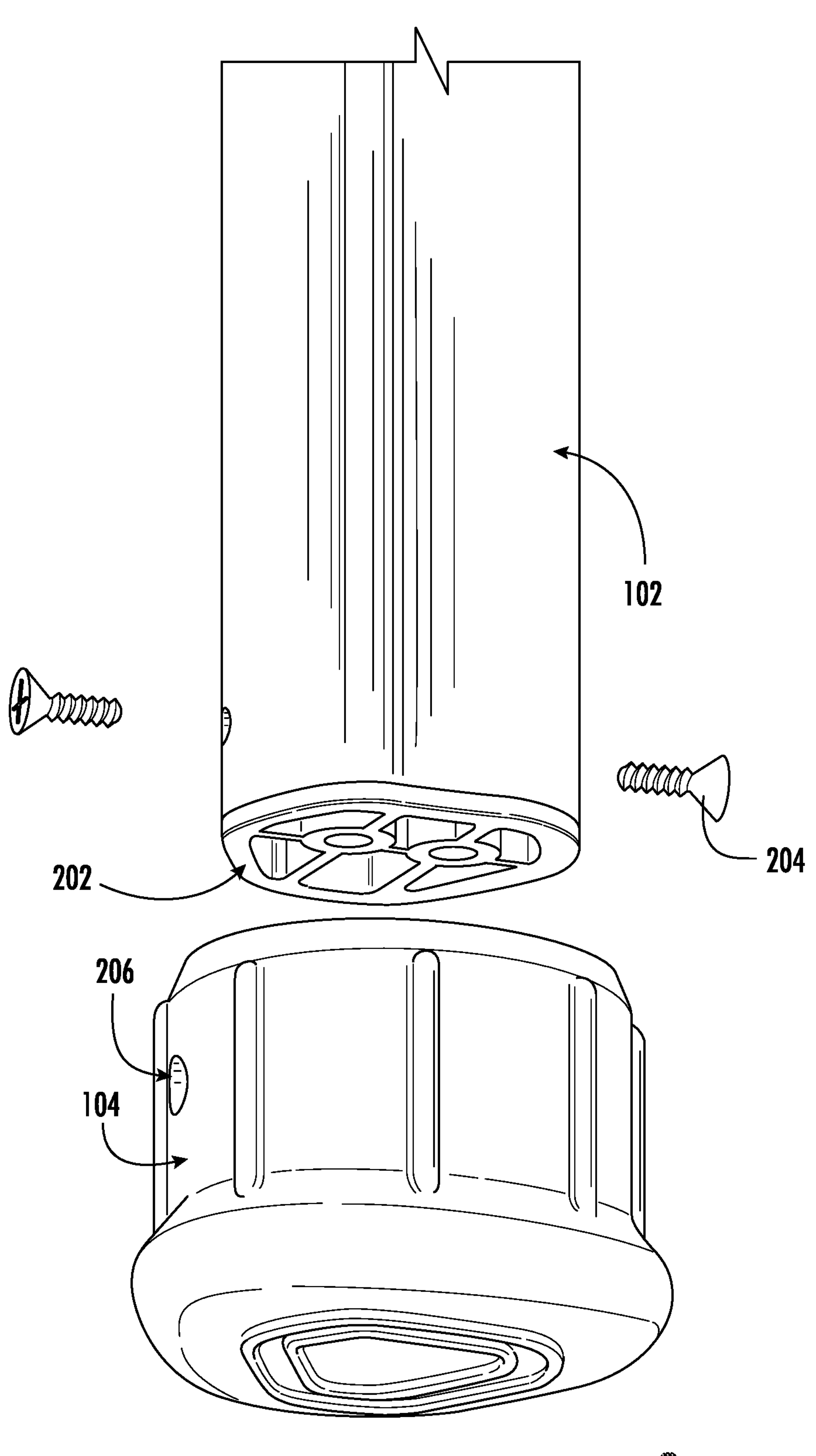
FIG. 2 illustrates an exploded view of a protective end cap attached to the example insulating device of FIG. 1 in accordance with an example embodiment of the present disclosure.

FIG. 2 illustrates an exploded view of the protective end cap 104 attaching to the body 102 of the insulating device 100. As shown in FIG. 2, the insulating device 100 may contain one or more fasteners (e.g., screws 204) attaching the protective end cap 104 to the body 102. In addition, the insulating device 100 may further include an interior end cap 202 attached to the body 102 and configured to receive the fasteners (e.g. screws 204) in some embodiments.

As illustrated in FIG. 2, the insulating device 100 may further include an interior end cap 202 attached to the end of the body 102. The interior end cap 202 may be any structure capable of attaching to the body 102 and preventing debris and other objects from entering the interior of the body 102 while allowing fluid communication between the interior of the body 102 and an external environment to prevent buildup of water or other fluids in the interior of the body 102. The interior end cap 202 may be formed of an engineered plastic (e.g., thermoplastics and thermosets), metal, wood, or other similar material. In some embodiments, the interior end cap 202 may further engage with an end of a nested body 102 section (e.g., section 802 as shown in FIG. 8), ensuring the section 802 remains nested in the interior of the containing body 102 section 802. In some embodiments, the interior end cap 202 may be configured to receive the fasteners (e.g., screws 204) after passing through the protective end cap 104.

As illustrated in FIG. 2, the protective end cap 104 may include one or more fastener inserts 206 configured to receive a fastener (e.g., screw 204) and designed to facilitate attachment of the protective end cap 104 to the body 102 of the insulating device 100. In some embodiments, the fastener inserts 206 may be countersunk or angled to receive the head of the fastener. In some embodiments, the head of the fastener may directly engage the outside surface of the protective end cap 104.

Figure 3:
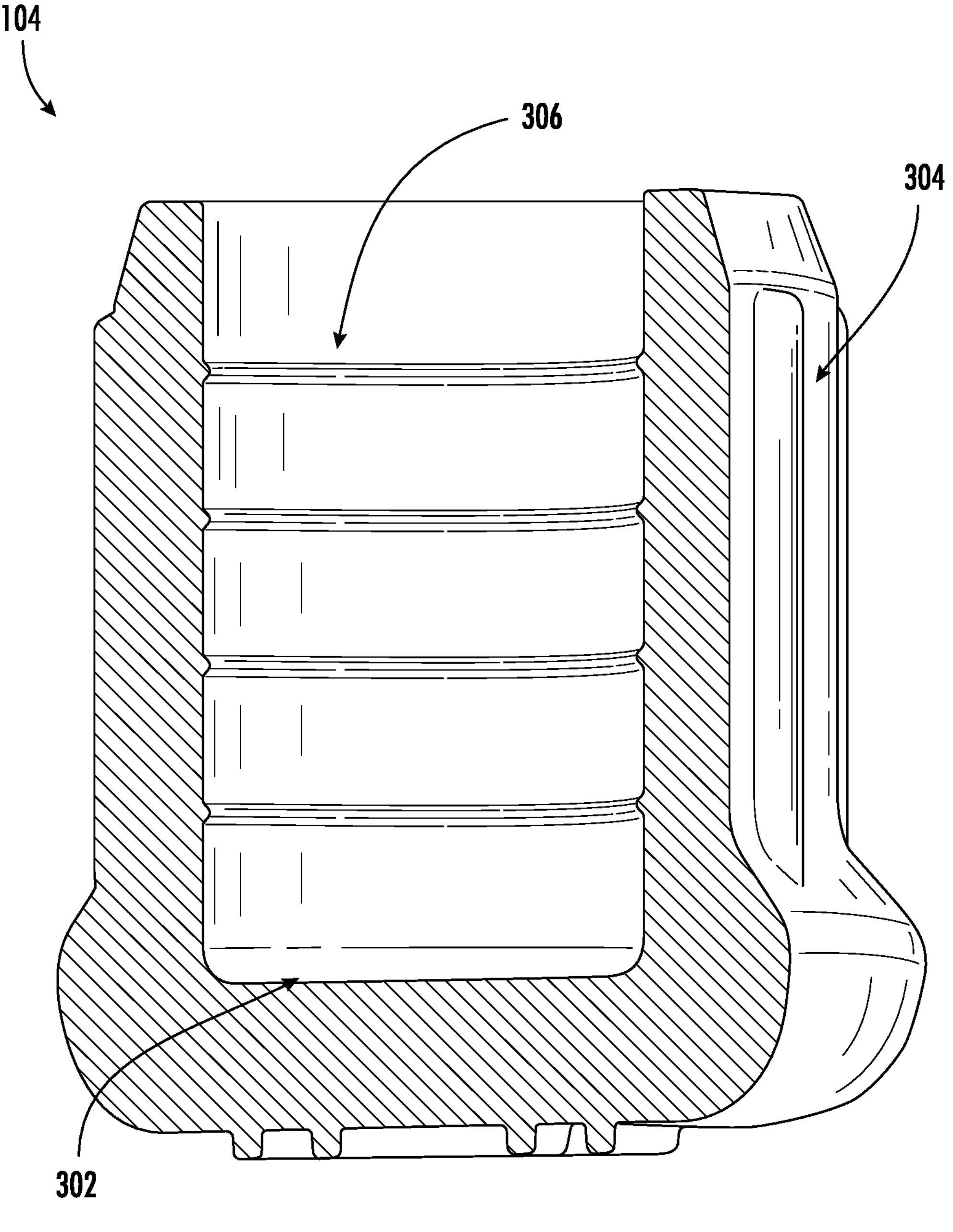
FIG. 3 illustrates a cross-sectional view of the example protective end cap of FIG. 2 in accordance with an example embodiment of the present disclosure.

FIG. 3 illustrates a cross-sectional view of the protective end cap 104. As shown in FIG. 3, the protective end cap 104 may define a base 302 and one or more walls 304 extending from the base 302 of the protective end cap 104. The one or more walls 304 of the protective end cap 104 may further contain ribs 306 running parallel to the surface of the base 302 on the interior of the walls 304 configured to engage the body 102 of the insulating device 100 when received by the protective end cap 104.

As illustrated in FIG. 3, the protective end cap 104 may define a base 302. The base 302 is any structure capable of supporting one or more walls 304 and providing impact protection to the body 102 of the insulating device 100. In some embodiments, the base 302 may be formed of an elastically deformable material capable of compressing under an impact force and returning to a resting form when the force is removed. In some embodiments, the base 302 may be hollow, allowing the space within the base 302 to narrow when an impact force is applied to the base 302. In some embodiments, the base 302 may be filled with foam, rubber, or other material to provide additional absorption of an impact force. In some embodiments, the base 302 may define a cross-sectional shape similar to the cross-sectional shape of the body 102 (e.g., triangular, tri-flat, or circular), however, the base 302 is not limited to a shape similar to the cross-sectional shape of the body 102.

As further illustrated in FIG. 3, the protective end cap 104 may define one or more walls 304. A wall 304 may be any structure attached to or an integral part of the base 302 and extending away from the surface of the base 302. In some embodiments, the protective end cap 104 may define one continuous, uninterrupted wall 304, for example, a circular wall. In some embodiments, the wall 304 may define multiple disjoint or disconnected walls. In some embodiments, the one or more walls 304 may be configured to at least partially receive the base end 806 of the body 102 of the insulating device 100. In such an embodiment, the cross-sectional shape defined by the interior perimeter of the walls 304 may be configured to match the cross-sectional shape of the outer surface of the body 102. In some embodiments, the walls 304 may be positioned so that the interior of the walls 304 engage with the exterior walls of the body 102. In some embodiments, the walls 304 may further define one or more elastically deformable protrusions (e.g., ribs 306) extending from the inner surface of the walls 304 and reducing the cross-sectional area enclosed by the walls 304. In some embodiments, the ribs 306 may extend in a line parallel to the surface of the base 302 and continue around the inner surface of the walls 304. In some embodiments, the ribs 306 may deform when encountering the outer surface of the body 102 and apply increased pressure to the outer surface of the body 102, holding the protective end cap 104 in place around the outer surface of the body 102. In some embodiments, the pressure applied by the body 102 of the insulating device 100 may further reduce the impact force experienced by the body 102 when an impact is experienced at the base 302 of the protective end cap 104. In some embodiments, the base 302, the walls 304, and the ribs 306 may form the protective end cap 104 as a single integral body.

Figure 4:
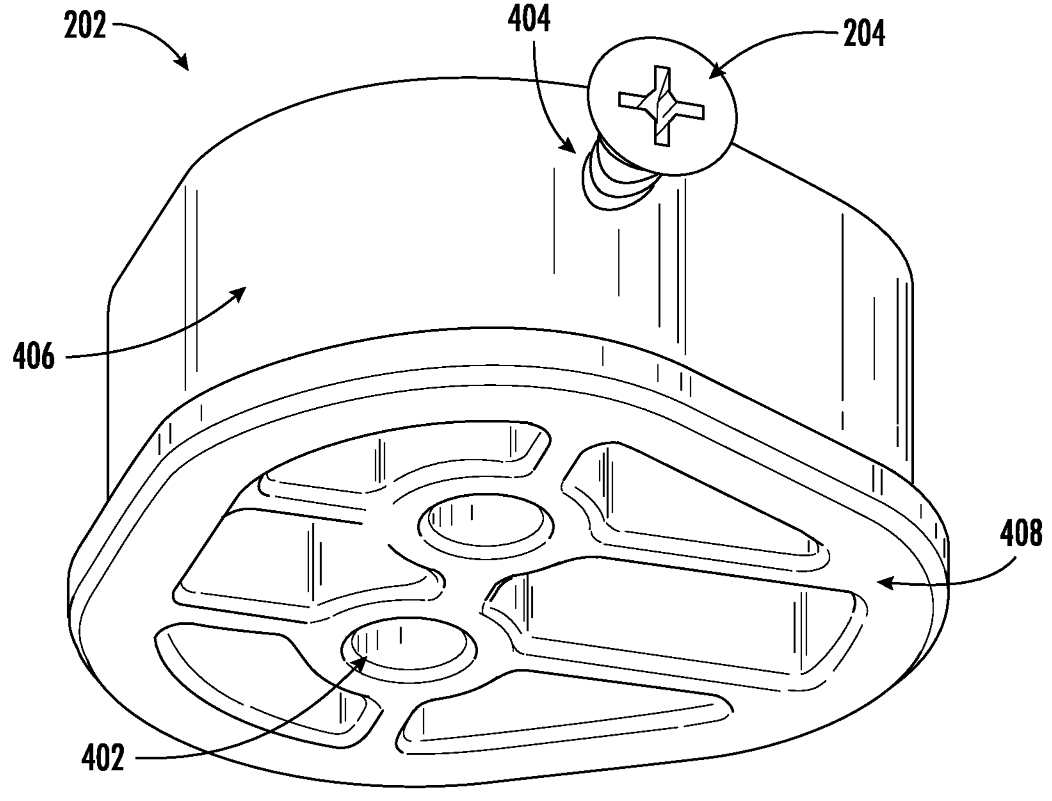
FIG. 4 illustrates a perspective view of an interior end cap in accordance with an example embodiment of the present disclosure.

FIG. 4 shows a perspective view of an interior end cap 202. As shown in FIG. 4, the interior end cap 202 may define an interior end cap base 408 and one or more interior end cap walls 406 extending from the surface of the interior end cap base 408. In addition, the interior end cap 202 may contain one or more vents 402 providing fluid communication between the interior of the insulating device 100 body 102 and an external environment.

Figure 10:
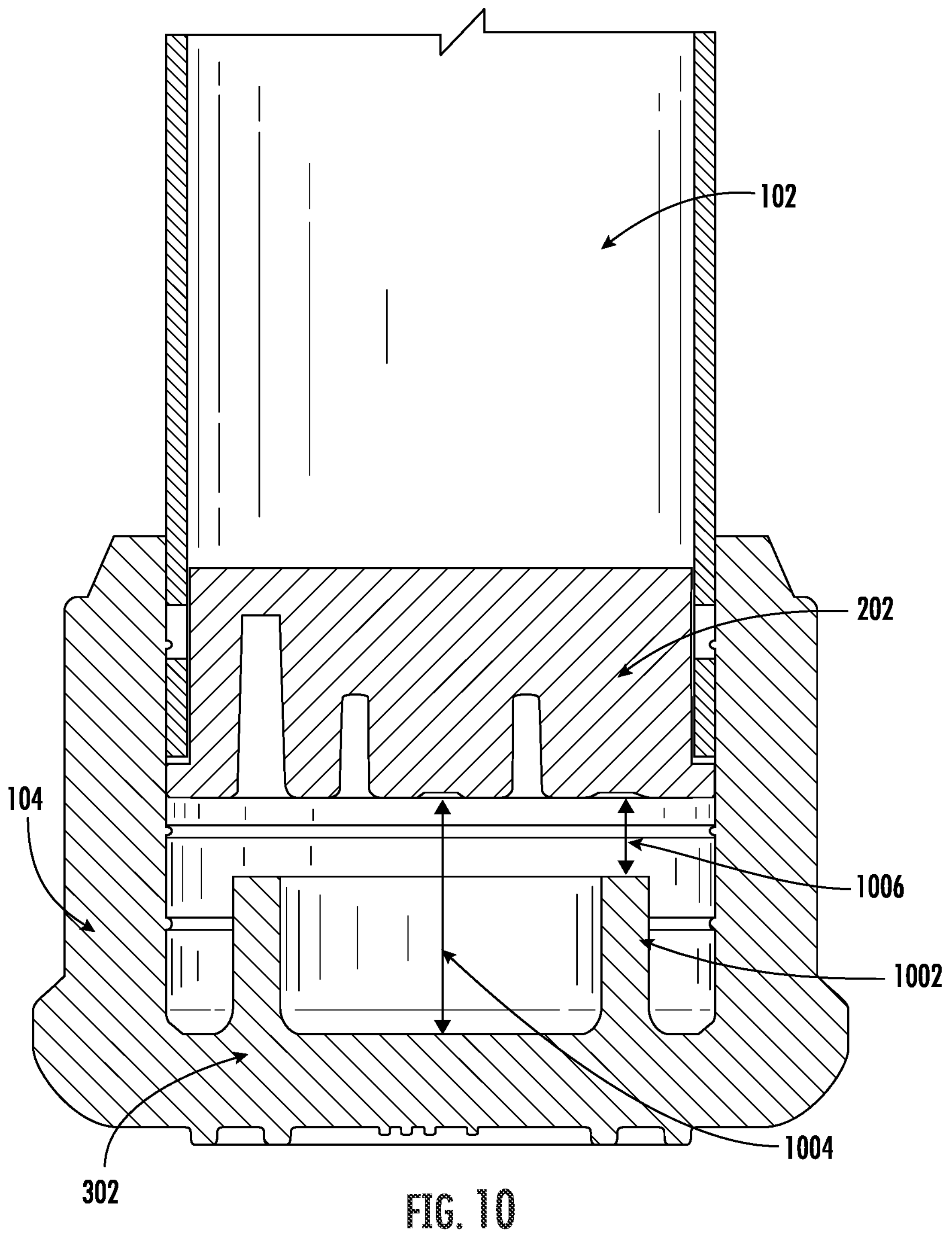
FIG. 10 illustrates a cross-sectional view of an example protective end cap defining a protruding structure in accordance with an example embodiment of the present disclosure.

As illustrated in FIG. 4, the interior end cap 202 may include an interior end cap base 408. The interior end cap base 408 may be any structure capable of supporting one or more interior end cap walls 406 and providing fluid communication between the interior of the body 102 and an external environment. In some embodiments, the peripheral edges of the interior end cap base 408 may align with the outer surface of the body 102. In such an embodiment, the shape of the surface of the interior end cap base 408 may match the shape of the body 102 (e.g., triangular, tri-flat, or circular). In some embodiments, the surface of the interior end cap base 408 opposite the surface adjacent the interior end cap walls 406 may define the peripheral edge of the body 102. In such an embodiment, the interior end cap base 408 may be configured to contact a protrusion extending from the base 302 of the protective end cap 104 (e.g., protrusion 1002 as shown in FIG. 10) reducing the impact of a force applied to the base 302 of the protective end cap 104. Still, in other embodiments, the interior end cap 202, including the interior end cap base 408 may be positioned completely within the walls of the body 102. In some embodiments, the interior end cap base 408 may further include one or more vents 402 configured to provide fluid communication between the interior of the body 102 and an outside environment. These vents 402 allow water and other fluids to escape the interior of the body 102, preventing potentially dangerous build-up of fluids in the body 102 which if undrained could compromise the electrical insulation of the insulating device 100.

As further illustrated in FIG. 4, the interior end cap 202 may further define interior end cap walls 406. In some embodiments, the interior end cap walls 406 may be configured to fit within the inner surface of the body 102. The interior end cap walls 406 may extend from the surface of the base into the interior of the body 102. The interior end cap walls 406 may define one continuous, uninterrupted wall, or may define a plurality of walls disjoint and/or disconnected. In some embodiments, the interior end cap wall 406 may further define one or more threaded inserts 404. The interior end cap wall 406 may be positioned to align with the fastener insert 206 in the outer surface of the protective end cap 104, allowing a fastener, in some embodiments, to be inserted into the fastener insert 206, pass through the body 102, and be received by the threaded insert 404.

Figure 5:
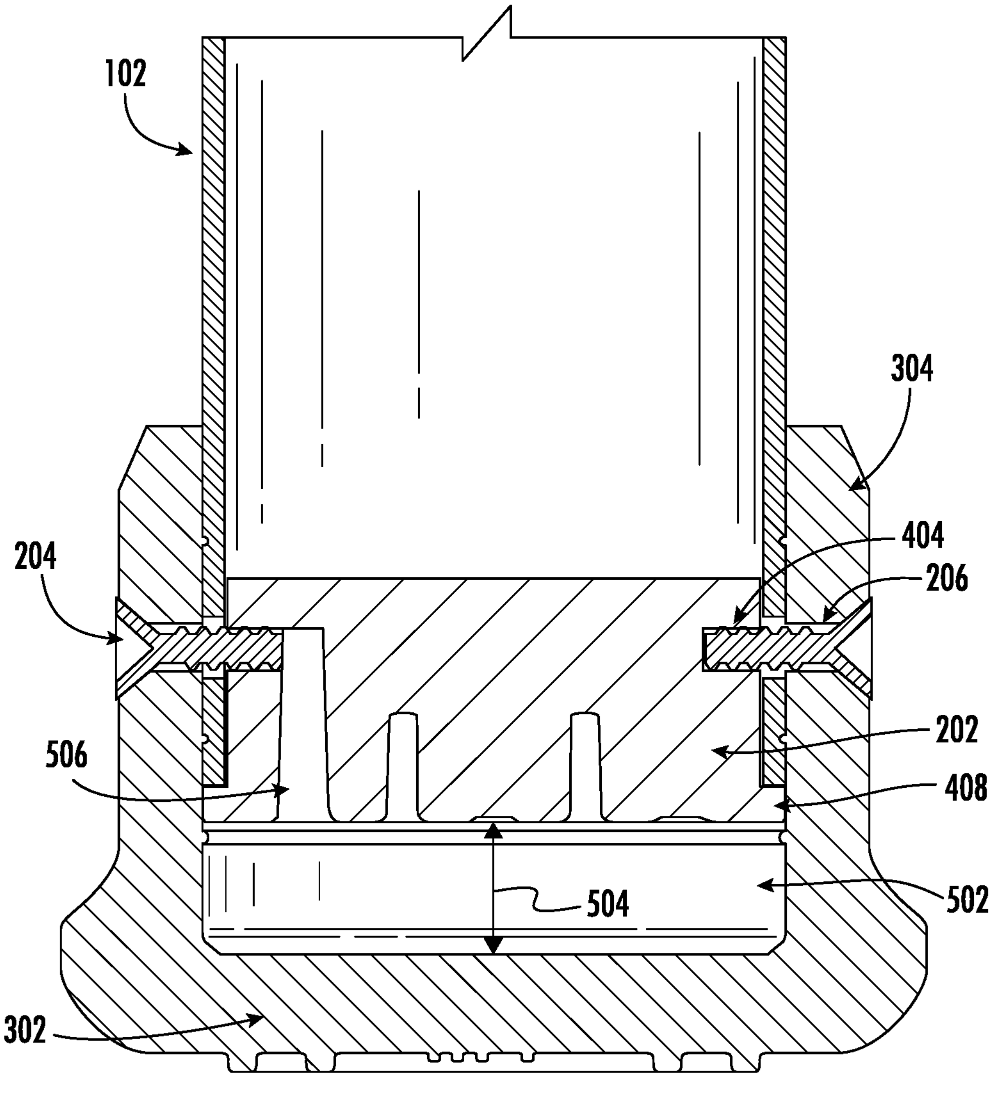
FIG. 5 illustrates a cross-sectional view of an example insulating device attached to a protective end cap in accordance with an example embodiment of the present disclosure.

FIG. 5 shows a cross-sectional view of the protective end cap 104 attached to a body 102 in an example insulating device 100. As shown in FIG. 5, the example insulating device 100 includes the protective end cap 104 attached to the body 102 with at least two fasteners (e.g., screws 204). The depicted screw 204 passes into the fastener insert 206 of the protective end cap 104, through the body 102 and into the threaded insert 404 of the interior end cap 202. The interior end cap base 408 of the depicted interior end cap 202 defines the peripheral edge of the body 102. The protective end cap 104 is positioned to define an impact reduction mechanism, including at least a gap (e.g., cavity 502) between the peripheral edge of the body 102 and the base 302 of the protective end cap 104 defining a distance 504. In addition, the example interior end cap 202 depicted in FIG. 5 further includes a button holder 506, configured to contain a button or other structure capable of locking the plurality of sections 802 of the body 102 in an extended position.

As illustrated in FIG. 5, the protective end cap 104 may be fastened to a body 102 in such a way to define a gap (e.g., cavity 502) between the peripheral edge of the body 102 and the base 302 of the protective end cap 104. Defining a gap (e.g., cavity 502) between the peripheral edge of the body 102 and the base 302 of the protective end cap 104 is one example embodiment of an impact reduction mechanism. As depicted in FIG. 5, the body 102 of the insulating device 100 may move toward the surface of the base 302 of the protective end cap 104 when a force is applied to the base 302 of the protective end cap 104. The movement of the body 102 toward the base 302 of the protective end cap 104 may be unobstructed by any structures or protrusions contained within the space between the peripheral edge of the body 102 and the base 302 of the protective end cap 104. As described in FIG. 4, in some embodiments, the peripheral edge of the body 102 may be defined by the interior end cap base 408 of the interior end cap 202, for example, when the interior end cap base 408 extends beyond the base of the body 102. In some embodiments, as the body 102 moves toward the surface of the protective end cap 104 base 302, the walls of the protective end cap 104 compress and/or elastically deform to absorb the force applied against the base 302 of the protective end cap 104. In some embodiments, the peripheral edge of the body 102 may contact the base 302 of the protective end cap 104, at which point, the base 302 will further compress, absorbing a portion of the impact force to the base 302 of the protective end cap 104. In some embodiments, a first distance (e.g., 504) may be defined between the surface of the base 302 of the protective end cap 104 and the peripheral edge of the body 102. The distance 504 may be reduced when force is applied to the exterior surface of the protective end cap 104 base 302. If the peripheral edge comes into contact with the base 302, the distance 504 is reduced to zero. In some embodiments, the distance 504 between the peripheral edge of the insulating device and the base 302 of the protective end cap 104 may be at least 3 millimeters and less than 200 millimeters. In some embodiments, between 3 millimeters and 100 millimeters. In some embodiments, between 3 millimeters and 30 millimeters.

As further illustrated in FIG. 5, the interior end cap 202 may further contain a button holder 506. The button holder 506 may be any structure capable of containing any device designed to lock the plurality of sections 802 of the body 102 in an extended position. In some embodiments, the button holder 506 may contain snap buttons or other spring-loaded buttons configured to lock into place when a section 802 of the body 102 is extended.

Figure 6B:
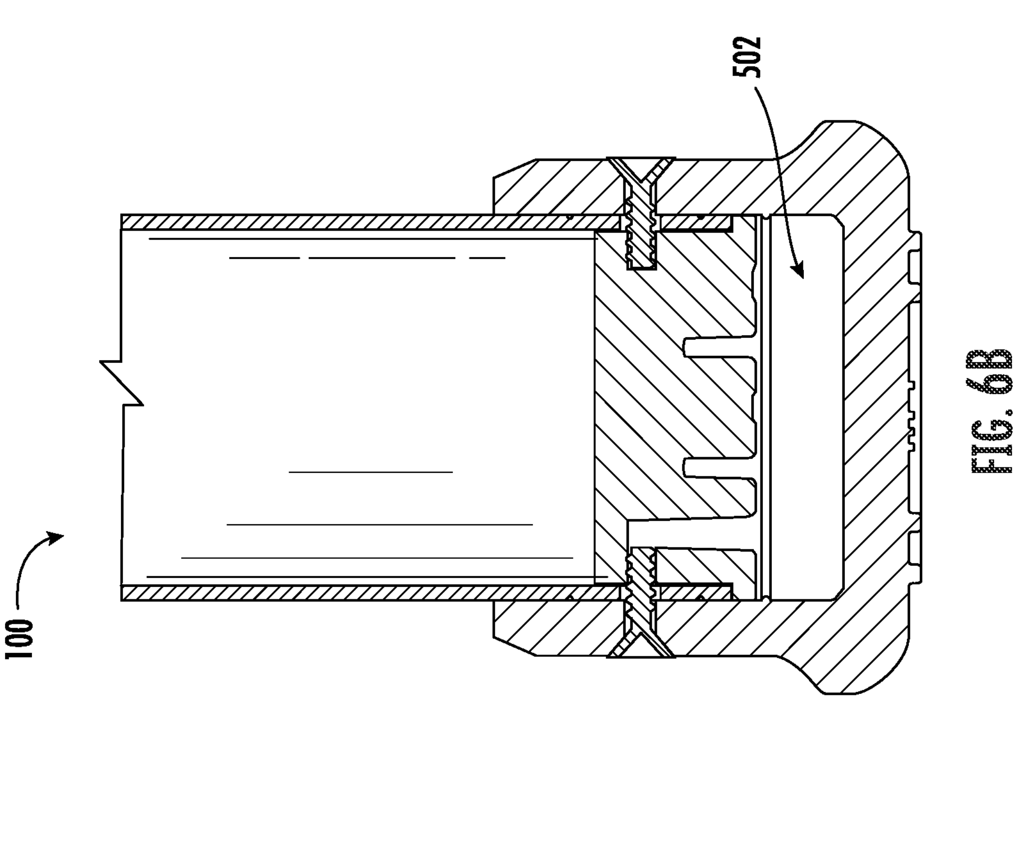
FIG. 6B illustrates a cross-sectional view of an example insulating device attached to a protective end cap with an impact reduction mechanism to provide impact reduction in accordance with an example embodiment of the present disclosure.
Figure 6A:
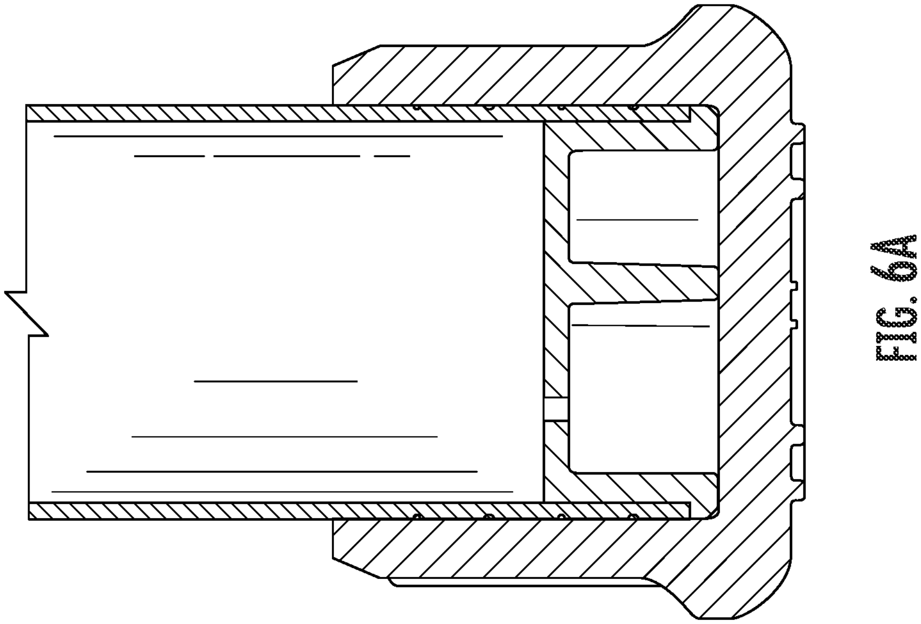
FIG. 6A illustrates a cross-sectional view of an example insulating device attached to a protective end cap having no cavity to provide impact reduction.

FIG. 6A illustrates an insulating device (e.g., hotstick) that does not contain an impact reduction mechanism, in contrast to those depicted in FIG. 5 and FIG. 10. As shown in FIG. 6A, the peripheral edge of the body 102 of the insulating device 100 is in direct contact with the base 302 of the protective end cap 104 while no force is being applied to the outer surface of the base 302 of the protective end cap 104. With the protective end cap 104 in direct contact with the peripheral edge of the body 102, the base 302 of the protective end cap 104 provides minimal impact absorption and transferring more force to the end of the body 102 of the insulating device 100 and creating a higher likelihood that the insulating device 100 will be damaged.

FIG. 6B illustrates an insulating device 100 wherein the impact reduction mechanism is defined by fastening the protective end cap 104 to the body 102 such that a gap (e.g., cavity 502) may be defined between the peripheral edge of the insulating device 100 body 102 and the base 302 of the protective end cap 104. The impact reduction mechanism as illustrated in FIG. 6B absorbs more impact force applied to the outer surface of the protective end cap 104 base 302, as compared to the device of FIG. 6A, resulting in less impact force transferring to the body 102 of the insulating device 100.

Figure 7:
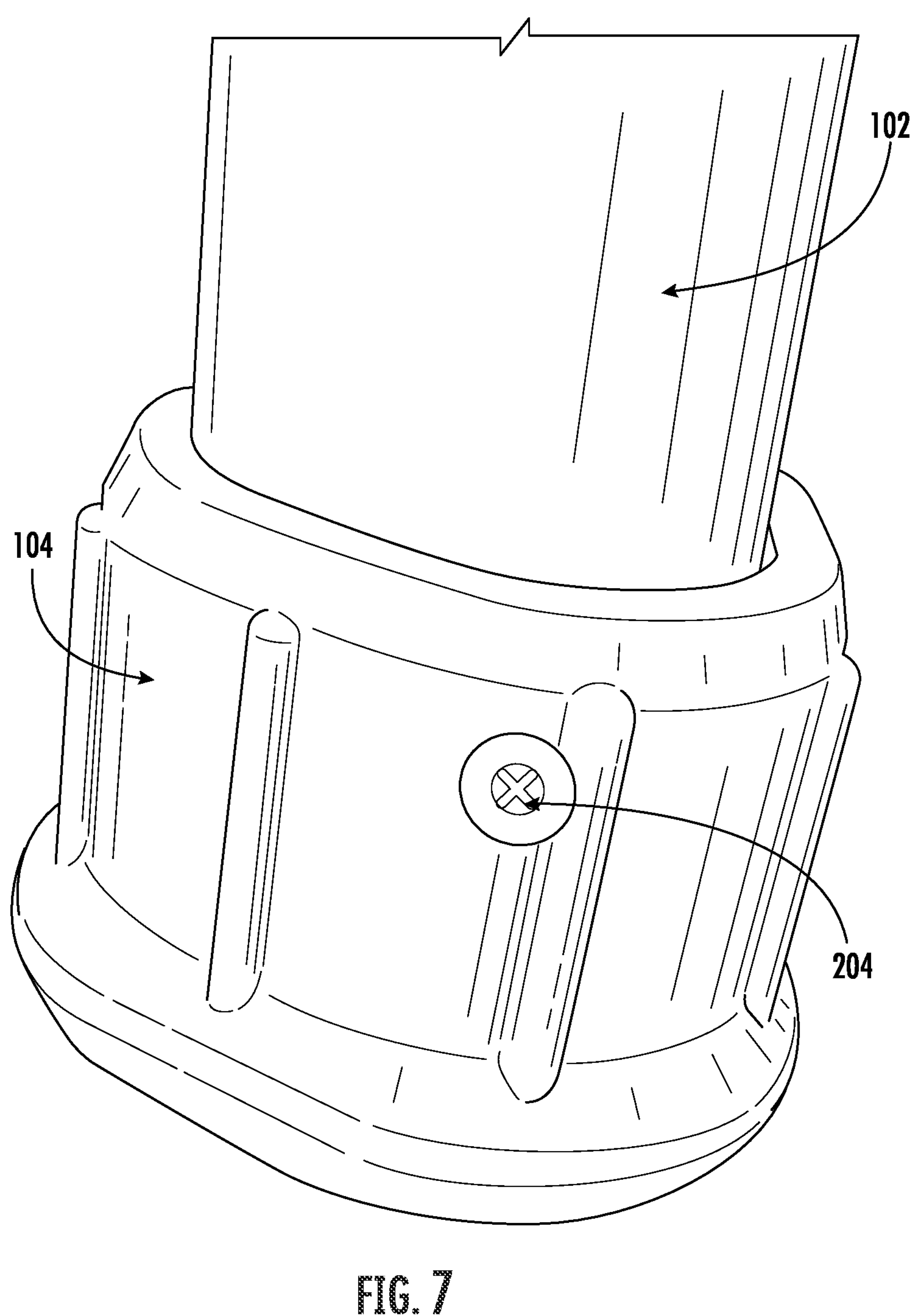
FIG. 7 illustrates a prospective view of a protective end cap attached to an example insulating device in accordance with an example embodiment of the present disclosure.

FIG. 7 depicts a perspective view of an example insulating device 100 according to an example embodiment of the present disclosure, wherein the protective end cap 104 is attached to the body 102 using one or more fasteners (e.g., screws 204).

FIG. 8 illustrates a cross-sectional view of an insulating device 100 in accordance with an example embodiment of the present disclosure. As shown in FIG. 8, the body 102 of the insulating device 100 may contain a plurality of sections 802*a-e*. In addition, the insulating device 100 body 102 may include a base end 806 attached to a protective end cap 104 and an attachment end 804 capable of receiving a tool attachment.

As illustrated in FIG. 8, the insulating device 100 may include a plurality of sections 802*a-e* making up the body 102 of the insulating device 100. In some embodiments, the plurality of sections 802*a-e* may be nested sequentially inside an adjacent section 802 making the insulating device 100 capable of extension and retraction. For example, section 802*b* may be nested inside of section 802*a*, section 802*c* may be nested inside of section 802*b*, section 802*d* may be nested inside of section 802*c*, and so forth. To facilitate nesting, in some embodiments, adjacent sections 802 may have the same cross-sectional shape but at a smaller dimension such that the adjacent section 802 is capable of sliding within the interior walls of the adjacent section 802. For example, section 802*b* may have the same cross-sectional shape as section 802*a* but a smaller max cross-sectional dimension, such that the interior cross-sectional dimension of section 802*a* is bigger than the exterior cross-sectional dimension of section 802*b*. FIG. 8 depicts an example embodiment in which each adjacent section 802 of the plurality of sections 802*a-e* extends beyond the peripheral edge of the adjacent section 802. For example, section 802*b* extends beyond a peripheral edge of section 802*a*, section 802*c* extends beyond a peripheral edge of section 802*b*, and so on. In some embodiments, each sequential section may be capable of locking into an extended position, for example, with a snap button, with a spring-loaded button, by a threaded end, or a similar locking mechanism.

As further illustrated in FIG. 8, the insulating device 100 may further include an attachment end 804. The attachment end 804 may be, in some embodiments, capable of receiving interchangeable attachments provided to aid the user in performing tasks using the insulating device 100. In some embodiments, the attachment may be fixed on the attachment end 804 of the insulating device 100. The attachment end 804 allows a user to utilize tools to perform tasks without subjecting the user to hazardous condition in environments exhibiting hazardous conditions.

As further illustrated in FIG. 8, the insulating device 100 may further include a base end 806. The base end 806 provides a place for the user to grip and control the insulating device 100 while utilizing the tool on the attachment end 804 of the insulating device 100. In some embodiments, the base end 806 will further include a protective end cap 104 protecting the insulating device 100 body 102 from damage when the insulating device 100 is dropped, falls, or jostled during storage and transport.

Figure 9:
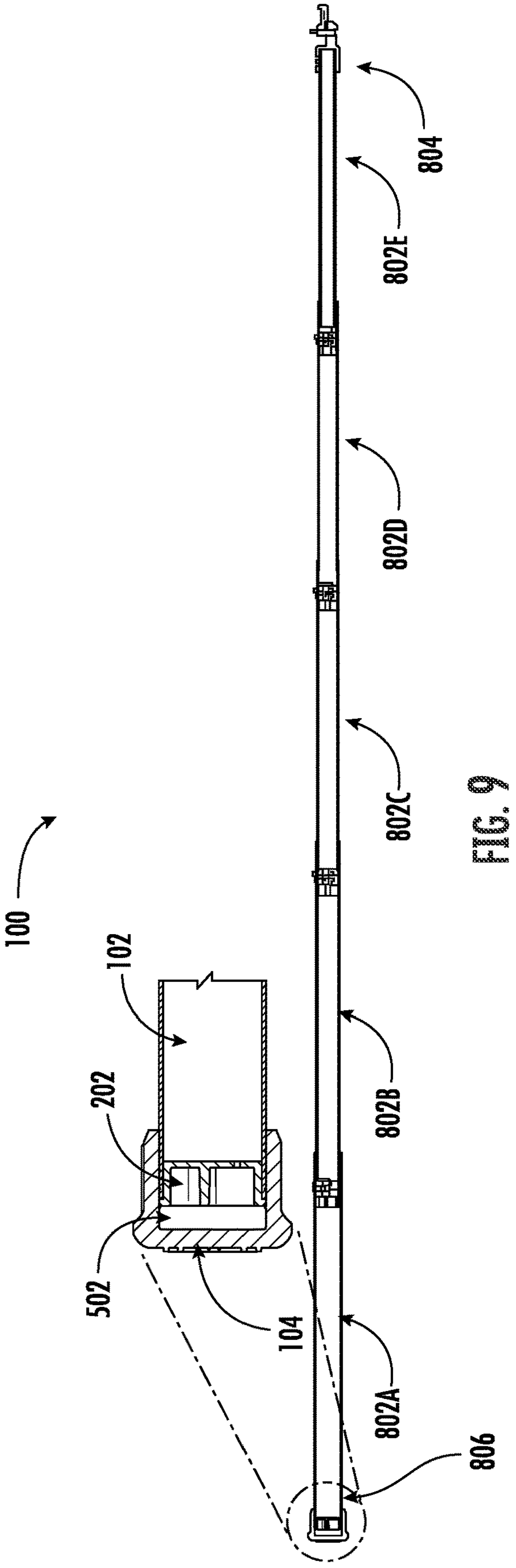
FIG. 9 illustrates the cross-sectional view of the example insulating device of FIG. 8 with a close-up of the protective end cap in accordance with an example embodiment of the present disclosure.

FIG. 9 illustrates a cross-sectional view of an insulating device 100 in accordance with an example embodiment of the present disclosure, including an enlarged cross-section of a protective end cap 104 attached to the section 802*a* at the base end 806 of the body 102. FIG. 9 further depicts an example embodiment of an impact reduction mechanism including a cavity 502 defined between the peripheral edge of the base end 806 of the body 102 and the base 302 of the protective end cap 104. As shown in FIG. 9, in some embodiments, the peripheral edge of the body 102 may be defined by the interior end cap base 408. Providing a gap, such as the cavity 502 depicted in FIG. 9 reduces the impact force transferred to the body 102 of the insulating device 100 when a force impacts the base 302 of the protective end cap 104.

FIG. 10 illustrates a cross-sectional view of another example embodiment of an impact reduction mechanism, including one or more protrusions 1002 extending from the base 302 of the protective end cap 104 into the cavity 502 defined between the peripheral edge of the body 102 and the base 302 of the protective end cap 104.

As illustrated in FIG. 10, an impact reduction mechanism of an insulating device 100 may include one or more protrusions 1002, such as, for example, the circular protrusion depicted in FIG. 10. The protrusion 1002 may be any structure capable of contacting the peripheral edge of the body 102 and/or the interior end cap 202 and reducing the impact force transferred to the body 102 of the insulating device 100 when the base 302 of the protective end cap 104 is impacted. In some embodiments, the protrusion 1002 may be elastically deformable, for example, formed of EPDM rubber. In some embodiments, the protrusion 1002 may be a continuous circular shape extending from the base 302 of the protective end cap 104 toward the body 102 of the insulating device 100. In some embodiments, the protective end cap 104 may contain a plurality of protrusions 1002 configured to contact the interior end cap 202 and reduce the force of an impact.

As further illustrated in FIG. 10, the impact reduction mechanism depicted defines two distances, 1004 and 1006. The distance 1006 is the distance between the peripheral edge of the body 102 and the uppermost point of the protrusion 1002. The distance 1004 is the distance between the peripheral edge of the body 102 and the surface of the base 302 of the protective end cap 104. As illustrated in FIG. 10, the distance 1006 corresponding to the distance between the peripheral edge of the body 102 and the base 302 of the protective end cap 104 is necessarily smaller than the distance 1004. In some embodiments, the resting position of the body 102 is on top of the one or more protrusions 1002, making the distance 1006 zero.

Figure 11:
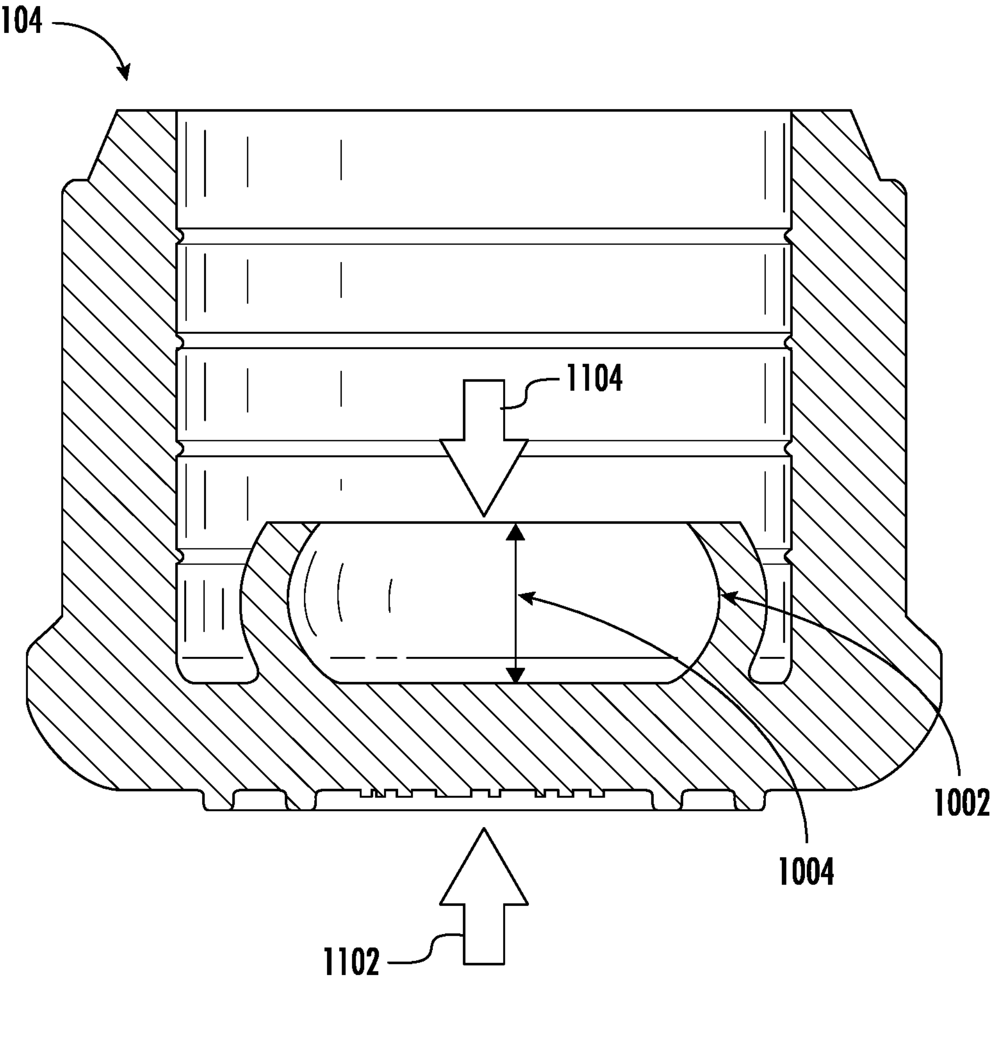
FIG. 11 illustrates a cross-sectional view of the example protective end cap of FIG. 10 experiencing an impact in accordance with an example embodiment of the present disclosure.

FIG. 11 illustrates a cross-sectional view of the protective end cap 104 when experiencing an impact force 1102 against the base 302 of the protective end cap 104. When experiencing an impact force 1102, the weight of the insulating device 100 pushes down toward the base 302 of the protective end cap 104 as shown by the insulating device force 1104. In an embodiment of the impact reduction mechanism including one or more protrusions 1002, as depicted in FIG. 11, the impact force 1102 and the insulating device force 1104 may cause the one or more protrusions 1002 to elastically deform, absorbing at least some of the impact force.

Figure 12:
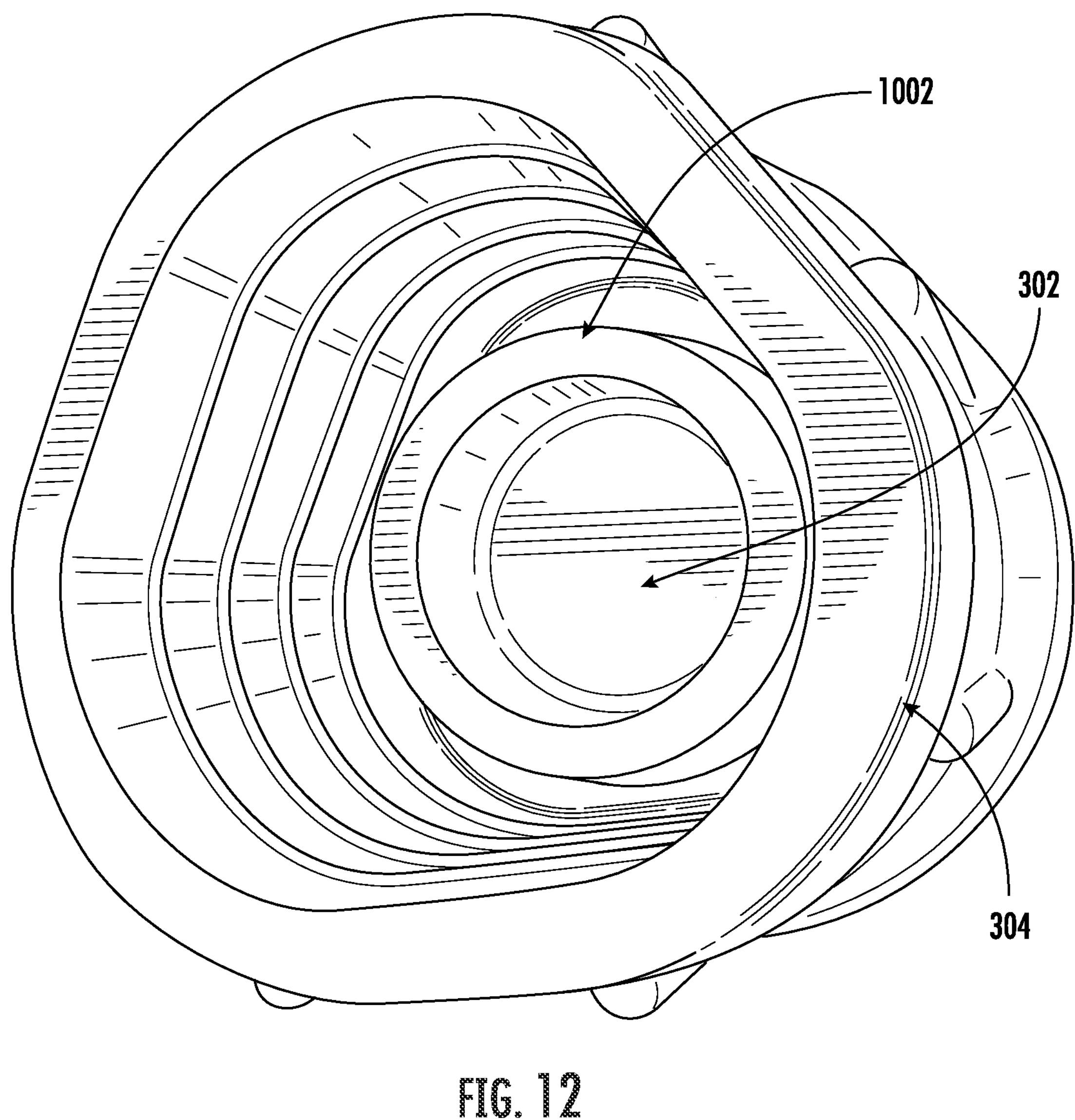
FIG. 12 illustrates a perspective view of the example protective end cap of FIG. 10 in accordance with an example embodiment of the present disclosure.

FIG. 12 depicts a perspective view of an example protective end cap 104 according to an example embodiment of the present disclosure. As depicted in FIG. 12, the protective end cap 104 may define a wall 304 or walls 304 configured to receive the base end 806 of the insulating device 100 body 102. As further depicted in FIG. 12, the protective end cap 104 may further include a base 302. In some embodiments, one or more protrusions 1002 may extend from the base 302 toward the base end 806 of the insulating device 100 body 102, reducing the impact force transferred to the body 102 of the insulating device 100.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to an insulating device, however, one skilled in the art may recognize that such principles may be applied to a pole saw, a window washing pole, a dusting pole, a general telescoping extension pole, or any other similar device. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of" and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An insulating device comprising:

a body including:

a first end;

a second end; and an electrical insulator configured to prevent a flow of electricity between the first end and the second end; and a protective end cap attached to the first end of the body defining a base and one or more walls, wherein the protective end cap comprises an impact reduction mechanism defining a gap formed between the first end of the body and the base of the protective end cap, wherein the impact reduction mechanism is configured to reduce an overall force received by the body in an instance in which the protective end cap is subjected to an impact force.

2. The insulating device of claim 1, wherein, in an instance in which the protective end cap is subjected to the impact force, the body moves unobstructed at least partially into the gap formed between the first end of the body and the base of the protective end cap.

3. The insulating device of claim 2, wherein the one or more walls of the protective endcap elastically deform responsive to the impact force.

4. The insulating device of claim 1, wherein the base of the protective end cap further comprises a protrusion extending from the base into the gap toward the first end of the body.

5. The insulating device of claim 4, wherein a first distance is defined between the first end of the body and the base of the protective end cap, and a second distance is defined between the first end of the body and the protrusion extending from the base, and wherein the first distance is less than the second distance.

6. The insulating device of claim 5, wherein, responsive to the impact force, the protrusion elastically deforms reducing the first distance defined between the first end of the body and the base of the protective end cap.

7. The insulating device of claim 1, wherein the body comprises a plurality of sections, each of which nest sequentially within one another.

8. The insulating device of claim 7, wherein a first section of the plurality of sections is nested within a second section of the plurality of sections.

9. The insulating device of claim 7, wherein a first section of the plurality of sections extends beyond a peripheral edge of a second section of the plurality of sections.

10. The insulating device of claim 1, wherein the base and the one or more walls of the protective end cap form a single integral body.

11. The insulating device of claim 1, wherein the first end of the body is at least partially received by the one or more walls of the protective end cap.

12. The insulating device of claim 1, wherein the protective end cap comprises an elastically deformable material.

13. The insulating device of claim 12, wherein the elastically deformable material comprises a durometer between 50 and 70.

14. The insulating device of claim 1, further comprising an interior end cap attached to the first end of the body.

15. The insulating device of claim 14, wherein the interior end cap is enclosed within the one or more walls of the protective end cap.

16. The insulating device of claim 14, wherein the interior end cap defines one or more vents providing fluid communication between an interior of the body and an exterior environment.

17. The insulating device of claim 16, wherein the protective end cap attaches to the first end of the body via one or more fasteners.

18. The insulating device of claim 17, wherein the one or more fasteners pass through the protective end cap, through the body, and into the interior end cap.

19. The insulating device of claim 1, wherein the protective end cap is attached to the first end of the body via an adhesive.

20. The insulating device of claim 1, wherein the gap defined between the first end of the body and the base of the protective end cap is at least 3 millimeters and less than 200 millimeters.

* * * * *